United States Patent
Kobayashi et al.

(10) Patent No.: US 10,328,884 B2
(45) Date of Patent: Jun. 25, 2019

(54) AIRBAG DEVICE FOR FRONT PASSENGER SEAT

(71) Applicant: Toyota Jidosha Kabushiki Kaisha, Toyota-shi, Aichi-ken (JP)

(72) Inventors: Ippei Kobayashi, Okazaki (JP); Nobuya Nakakura, Inazawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 35 days.

(21) Appl. No.: 15/366,259

(22) Filed: Dec. 1, 2016

(65) Prior Publication Data

US 2017/0158154 A1 Jun. 8, 2017

(30) Foreign Application Priority Data

Dec. 4, 2015 (JP) .................................. 2015-237967

(51) Int. Cl.
*B60R 21/205* (2011.01)
*B60R 21/2338* (2011.01)
(Continued)

(52) U.S. Cl.
CPC .......... *B60R 21/205* (2013.01); *B60R 21/013* (2013.01); *B60R 21/01332* (2014.12); *B60R 21/231* (2013.01); *B60R 21/233* (2013.01); *B60R 21/237* (2013.01); *B60R 21/2338* (2013.01); *B60R 2021/0004* (2013.01); *B60R 2021/0009* (2013.01);
(Continued)

(58) Field of Classification Search
CPC . B60R 21/205; B60R 21/013; B60R 21/2338; B60R 21/233; B60R 21/231; B60R 21/237; B60R 2021/01315; B60R 2021/23384; B60R 2021/23308; B60R 2021/23382; B60R 2021/0009; B60R 2021/0048; B60R 2021/0004; B60R 2021/23161; B60R 2021/01238; B60R 2021/01225; B60R 2021/01231; B60R 2021/0023
USPC ................ 280/730.1, 729, 743.2, 743.1, 732
See application file for complete search history.

(56) References Cited

U.S. PATENT DOCUMENTS

| | | |
|---|---|---|
| 2015/0166002 A1 | 6/2015 | Fukawatase |
| 2015/0367802 A1 | 12/2015 | Fukawatase et al. |
| 2016/0009242 A1 | 1/2016 | Fukawatase |
| 2016/0039385 A1* | 2/2016 | Watamori ......... B60R 21/23138 280/730.1 |
| 2016/0311392 A1* | 10/2016 | Jindal .................. B60R 21/231 |

(Continued)

FOREIGN PATENT DOCUMENTS

| | | |
|---|---|---|
| JP | 2008-044594 A | 2/2008 |
| JP | 2015113027 A | 6/2015 |

(Continued)

*Primary Examiner* — Keith J Frisby
(74) *Attorney, Agent, or Firm* — Dinsmore & Shohl LLP

(57) ABSTRACT

An airbag device for a front passenger seat includes a front passenger seat airbag main body, a center airbag portion, an actuator and a control section. The actuator is configured to switch a strap between a first state and a second state. In the first state, the center airbag portion is retained in a folded state. In the second state, the other end portion of the strap is released and the center airbag portion is allowed to inflate and expand. The control section sets the actuator to the first state when there is a full overlap frontal collision, and sets the actuator to the second state when there is a collision that is any of an oblique collision against a driver seat side of a vehicle front portion or a small overlap collision.

6 Claims, 5 Drawing Sheets

(51) Int. Cl.
*B60R 21/231* (2011.01)
*B60R 21/237* (2006.01)
*B60R 21/0132* (2006.01)
*B60R 21/233* (2006.01)
*B60R 21/013* (2006.01)
*B60R 21/00* (2006.01)
*B60R 21/01* (2006.01)

(52) U.S. Cl.
CPC ............ *B60R 2021/0023* (2013.01); *B60R 2021/0048* (2013.01); *B60R 2021/01225* (2013.01); *B60R 2021/01238* (2013.01); *B60R 2021/01315* (2013.01); *B60R 2021/23161* (2013.01); *B60R 2021/23308* (2013.01); *B60R 2021/23382* (2013.01); *B60R 2021/23384* (2013.01)

(56) References Cited

U.S. PATENT DOCUMENTS

| | | |
|---|---|---|
| 2017/0015270 A1 | 1/2017 | Ohno et al. |
| 2017/0036639 A1* | 2/2017 | Yamada ................ B60R 21/205 |
| 2017/0101071 A1* | 4/2017 | Kruse ................ B60R 21/0136 |
| 2018/0065587 A1* | 3/2018 | Maenishi .............. B60R 21/205 |

FOREIGN PATENT DOCUMENTS

| | | |
|---|---|---|
| JP | 2015120382 A | 7/2015 |
| JP | 2016007892 A | 1/2016 |
| JP | 2016016716 A | 2/2016 |
| JP | 2016020115 A | 2/2016 |
| JP | 2016020155 A | 2/2016 |
| JP | 2017024478 A | 2/2017 |

* cited by examiner

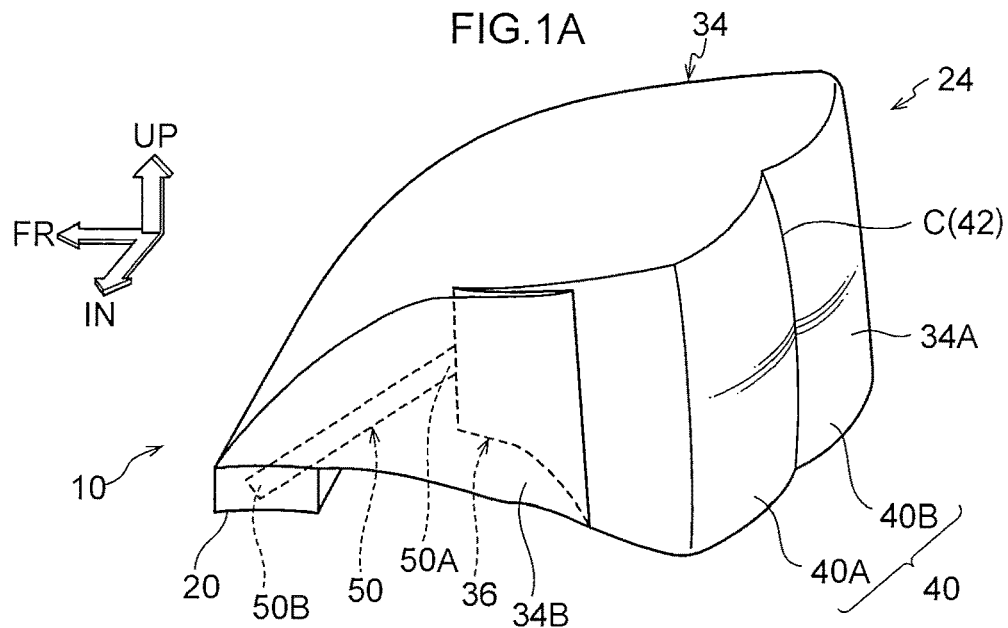
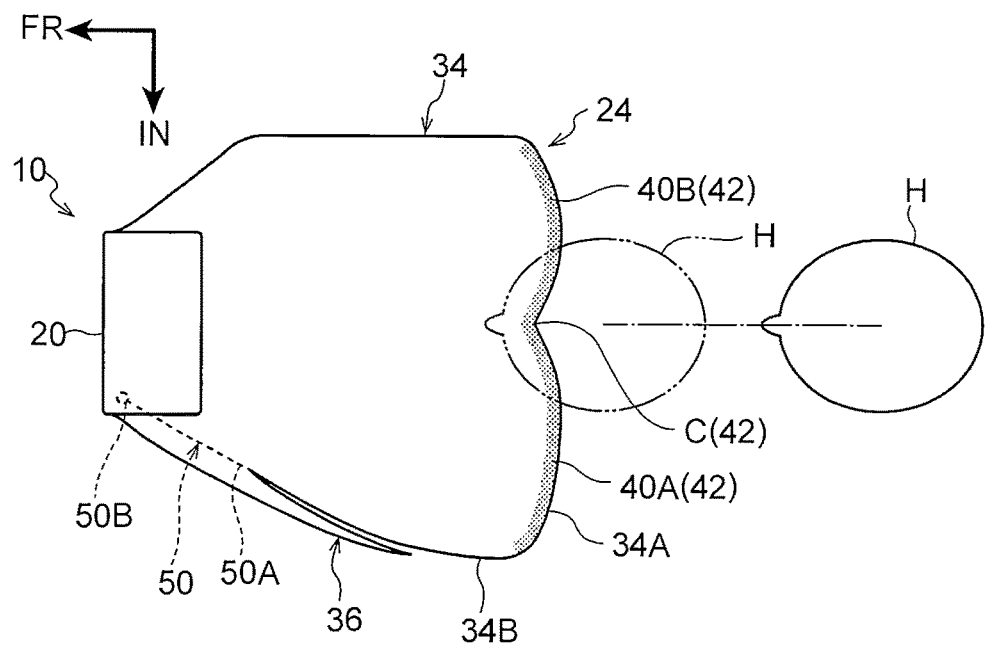

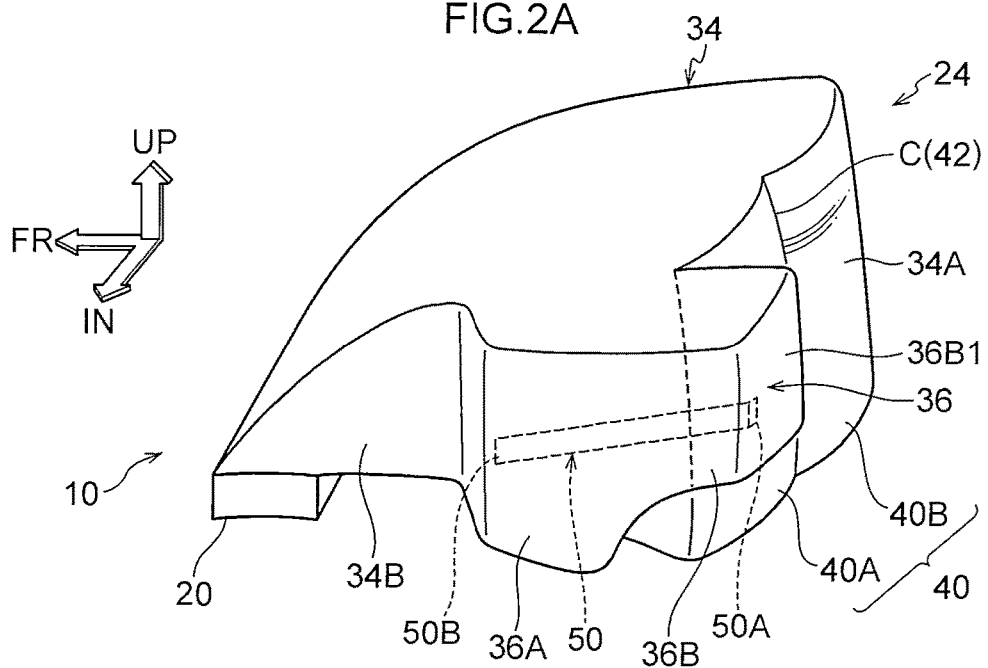
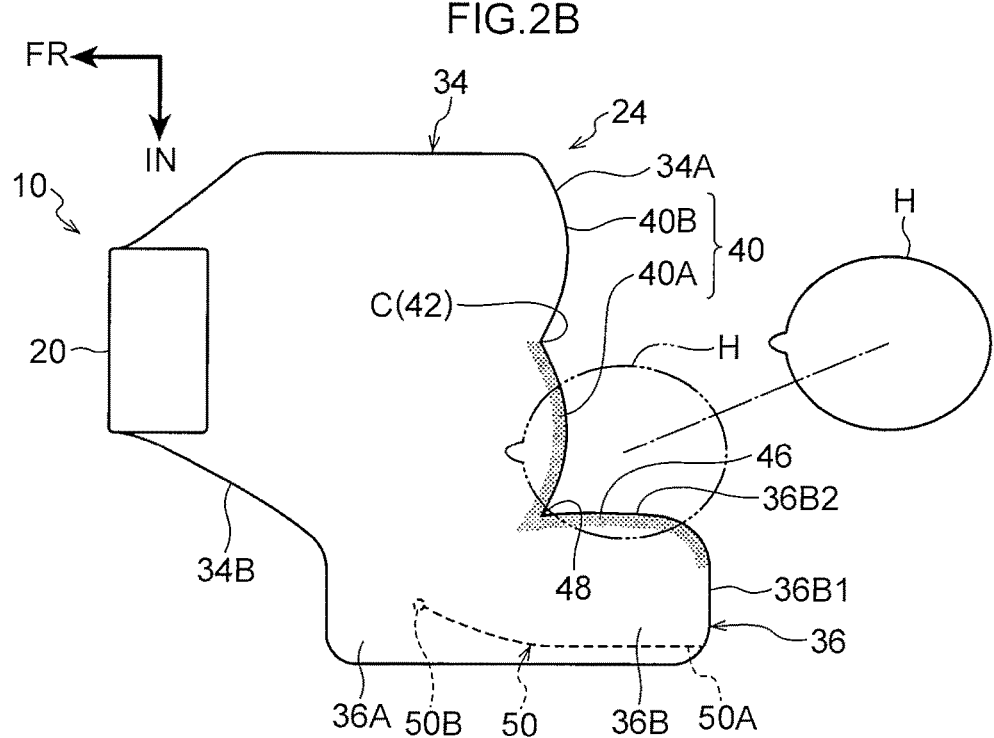

AIRBAG DEVICE FOR FRONT PASSENGER SEAT

CROSS-REFERENCE TO RELATED APPLICATION

This application is based on and claims priority under 35 USC 119 from Japanese Patent Application No. 2015-237967 filed on Dec. 4, 2015, the disclosure of which is incorporated by reference herein.

BACKGROUND

Technical Field

The present disclosure relates to an airbag device for a front passenger seat.

Related Art

Japanese Patent Application Laid-Open (JP-A) No. 2015-113027 discloses a front seat airbag system that is appropriate for oblique collisions and small overlap collisions (details of these collision states are described in the Detailed Description section). In this front seat airbag system, an additional center airbag is specified adjacent to the vehicle width direction inner side of a front passenger seat airbag (the side thereof at which a center console is disposed). The center airbag is provided separately and independently of the front passenger seat airbag. A completely expanded shape of the center airbag is designed such that a rear end portion of the center airbag protrudes further to the vehicle rear side than a rear end portion of the front passenger seat airbag. In this conventional technology, in order to improve head protection performance for a vehicle occupant sitting in a driver seat when there is an impact against the vehicle from diagonally forward, at the front passenger seat side of a vehicle front portion, a structure is employed in which the center airbag is structured separately and independently of the front passenger seat airbag and the two airbags are linked by a tear seam. In the descriptions below, a vehicle occupant sitting on a driver seat is referred to as "the driver seat occupant", and a vehicle occupant sitting on a front passenger seat is referred to as "the passenger seat occupant".

According to the structure described above, when, for example, there is an impact against the vehicle from diagonally forward at the driver seat side of the vehicle front portion, the front passenger seat airbag inflates and expands toward the side thereof at which the passenger seat occupant is disposed, and the center airbag inflates and expands to the vehicle width direction inner side (the center console side) of the front passenger seat airbag. In a completely expanded state, the rear end portion of the center airbag is disposed to protrude further to the vehicle rear side than the rear end portion of the front passenger seat airbag. Therefore, a side face of the center airbag that faces toward the side thereof at which the front passenger seat airbag is disposed functions as a restraining surface for the passenger seat occupant's head. Thus, even though the head of the passenger seat occupant moves by inertia in the direction toward the side of the impact at the vehicle front portion (diagonally toward the vehicle front and the side at which the center console is disposed), the head of the passenger seat occupant is restrained by both a rear end face of the front passenger seat airbag and the side face of the center airbag (see paragraphs 0070 to 0072 in the Specification of JP-A No. 2015-113027).

The conventional technology described above is effective as a vehicle occupant head protection technology when there is an oblique collision, a small overlap collision or the like. However, in the conventional technology as described above, the structure is employed in which the center airbag is structured separately and independently from the front passenger seat airbag and the two airbags are linked by a tear seam. Therefore, if there is an oblique collision, a small overlap collision or the like against the front passenger seat side of the vehicle front portion, then when the head of the passenger seat occupant is being restrained, the restraining surface of the front passenger seat airbag and the restraining surface of the center airbag may be moved apart and open a gap. In this situation, when the head of the passenger seat occupant abuts against the restraining surface of the font passenger seat airbag, the head of the passenger seat occupant is subjected to a frictional force from this restraining surface, and this frictional force may apply a turning moment about an axis in the vehicle up-and-down direction to the head of the passenger seat occupant.

As a countermeasure, forming the center airbag integrally with the front passenger seat airbag such that the center airbag does not separate from the front passenger seat airbag has been considered. However, in this case, an amount of gas required to inflate and expand the front passenger seat airbag is increased by an amount required for the center airbag. Thus, inflation and expansion of the front passenger seat airbag if there is a full overlap frontal collision is slowed.

Moreover, in a design in which a projection to the vehicle interior, such as a display or the like, is set at a vehicle width direction central portion of an instrument panel, a center airbag portion of the front passenger seat airbag may catch on the vehicle interior projection while expanding, which may affect the inflation and expansion of the front passenger seat airbag. Thus, a problem arises in that the shape of the restraining surface of the front passenger seat airbag may not be formed in accordance with objectives.

In consideration of the circumstances described above, a first object of the present disclosure is to provide an airbag device for a front passenger seat that may improve head protection performance for a passenger seat occupant when an impact occurs that is any of an oblique collision against the driver seat side of a vehicle front portion or a small overlap collision (hereinafter shortened to "when there is an oblique impact against the driver seat side or the like"), and that may also assure head restraint performance for the passenger seat occupant when there is a full overlap frontal collision. In addition, in consideration of the circumstances described above, a second object of the present disclosure is to provide an airbag device for a front passenger seat with which inflation and expansion of a front passenger seat airbag is not impeded even if a design is employed in which there is a projection to the vehicle interior at a vehicle width direction central portion of an instrument panel.

SUMMARY

An airbag device for a front passenger seat according to a first aspect includes: a front passenger seat airbag main body that is provided at a side of an instrument panel at which a front passenger seat is disposed, the front passenger seat airbag main body being inflated and expanded toward the side thereof at which the front passenger seat is disposed by gas that is supplied from an inflator, and a first head restraining surface being formed at a rear end portion of the front passenger seat airbag main body in a completely expanded state thereof; a center airbag portion that is formed integrally at a vehicle width direction inner side of the front passenger seat airbag main body, the center airbag portion being inflated and expanded toward the vehicle rear side by the gas that is supplied from the inflator, and a second head restraining surface being formed at a side face of the center airbag portion by a rear end portion of the center airbag portion in a completely expanded state thereof protruding further to the vehicle rear side than the rear end portion of the front passenger seat airbag main body, the side face facing to the side of the center airbag portion at which the front passenger seat airbag main body is disposed; an actuator that is configured to switch a strap between a first state and a second state, one end portion of the strap being fixed to an interior face at the side of the center airbag portion at which the rear end portion is provided, the center airbag portion being retained in a folded state in the first state, and another end portion of the strap being released and the center airbag portion being allowed to inflate and expand in the second state; and a control section that sets the actuator to the first state when there is a full overlap frontal collision, and that sets the actuator to the second state when there is an impact that is any of an oblique collision against a driver seat side of a vehicle front portion or a small overlap collision.

According to the first aspect, the center airbag portion is integrally formed at the vehicle width direction inner side of the front passenger seat airbag main body. The one end portion of the strap is fixed to the interior face at the rear end portion side of the center airbag portion. The another end portion of the strap is releasably retained by the actuator.

When a full overlap frontal collision occurs, the actuator is set in the first state by the control section. Therefore, the another end portion of the strap is not released and the center airbag portion is retained in the folded state thereof. As a result, only the front passenger seat airbag main body is inflated and expanded toward the vehicle rear side by the gas supplied from the inflator. In the completely expanded state, the first head restraining surface is formed at the rear end portion of the front passenger seat air bag main body. The head of a passenger seat occupant that is moving by inertia toward the vehicle front side is caught by the first head restraining surface, and the head is restrained thereat. That is, because only the front passenger seat airbag main body is inflated and expanded rather than the gas supplied from the inflator inflating and expanding both the font passenger seat airbag main body and the center airbag portion, the front passenger seat airbag main body can be inflated and expanded rapidly. Therefore, during a full overlap frontal collision, the head of the passenger seat occupant may be promptly restrained by the front passenger seat airbag main body.

In contrast, during an oblique collision against the driver seat side or the like, the actuator is put into the second state by the control section. Accordingly, the another end portion of the strap is released and the center airbag portion is allowed to inflate and expand. Hence, the gas produced from the inflator is supplied to both the front passenger seat airbag main body and the center airbag portion. As a result, the front passenger seat airbag main body inflates and expands toward the vehicle rear side and the first head restraining surface is formed at the rear end portion of the front passenger seat airbag main body in the completely expanded state.

Meanwhile, the center airbag portion at the vehicle width direction inner side of the front passenger seat airbag main body also inflates and expands toward the vehicle rear side. The rear end portion of the center airbag portion in the completely expanded state projects further to the vehicle rear side than the rear end portion of the front passenger seat airbag main body. Thus, the second head restraining surface is formed at the side face of the center airbag portion that faces to the side at which the front passenger seat airbag main body is disposed. Consequently, the head of the passenger seat occupant that is moving by inertia toward the vehicle front side and the vehicle width direction inner side, which is the side toward the impact, is caught by both the first head restraining surface and the second head restraining surface. Thus the head is restrained.

That is, when there is an oblique impact against the driver seat side or the like, both the front passenger seat airbag main body and the center airbag portion that is formed integrally therewith inflate and expand. Thus, turning of the head of the passenger seat occupant about an axis in the vehicle up-and-down direction is suppressed by both the first head restraining surface and the second head restraining surface. Therefore, head protection performance for the passenger seat occupant when there is an oblique impact against the driver seat side or the like is improved compared to a front passenger seat airbag that is not equipped with a center airbag portion, the airbag system recited in JP-A No. 2015-113027 in which a front passenger seat airbag and a center airbag are separately and independently structured, and the like.

In an airbag device for a front passenger seat according to a second aspect, in the first aspect, the one end portion of the strap is fixed to an interior face of a corner portion at the vehicle width direction inner side at the rear end portion of the center airbag portion.

According to the second aspect, because the one end portion of the strap is fixed to the interior face of the corner portion at the vehicle width direction inner side at the rear end portion of the center airbag portion, the corner portion at the location that is furthest from the inflator in the completely expanded state is pulled in by the strap. Accordingly, the length of the strap may be made short. Thus, the front passenger seat airbag main body and the center airbag portion are not overlarge during folding.

In an airbag device for a front passenger seat according to a third aspect, in the first aspect or the second aspect, a vehicle interior projection that protrudes to a vehicle cabin interior side is provided at a vehicle width direction central portion of an upper face portion of the instrument panel, in a vehicle plan view, the completely expanded state of the center airbag portion projects to the vehicle width direction inner side from a substantially central portion in the vehicle front-and-rear direction of a side face at the vehicle width direction inner side of the front passenger seat airbag main body, and when there is an impact that is any of an oblique collision against the driver seat side of the vehicle front portion or a small overlap collision, the control section switches the actuator from the first state to the second state while the front passenger seat airbag main body is inflating and expanding toward the vehicle rear side after the rear end portion of the front passenger seat airbag main body has passed a line projected along the vehicle width direction through a rear face of the vehicle interior projection but before the front passenger seat airbag main body has completely expanded.

Operation of the third aspect is as follows.

The vehicle interior projection that protrudes to the vehicle cabin interior side is provided at the vehicle width direction central portion of the upper face portion of the instrument panel. Consequently, if a center airbag portion for which no consideration was given to interference with the vehicle interior projection was simply inflated and expanded when there was an impact against the driver seat side or the like, this center airbag portion might interfere with the vehicle interior projection during the inflation and expansion.

However, with the center airbag portion according to the present aspect, when the completely expanded state of the center airbag portion is viewed in a vehicle plan view, the rear end portion of the center airbag portion is disposed at the vehicle rear side relative to the vehicle interior projection. Therefore, considering the completely expanded shape of the center airbag portion, the center airbag portion does not interfere with the vehicle interior projection. Further, when there is an oblique impact against the driver seat side or the like, the control section switches the actuator from the first state to the second state during the inflation and expansion of the front passenger seat airbag main body toward the vehicle rear side, after the rear end portion of the front passenger seat airbag main body has passed the line projected in the vehicle width direction from the rear face of the vehicle interior projection but before the front passenger seat airbag main body has completely expanded. Therefore, the center airbag portion inflates and expands after the rear end portion of the front passenger seat airbag main body has passed the line projected along the vehicle width direction through the rear face of the vehicle interior projection. Thus, interference between the center airbag portion and the vehicle interior projection is avoided.

As described above, the airbag device for a front passenger seat according to the first aspect has excellent effects in that head protection performance for a passenger seat occupant when there is an oblique impact against the driver seat side or the like may be improved and in that head restraint performance for the passenger seat occupant when there is a full overlap frontal collision may be assured.

The airbag device for a front passenger seat according to the second aspect has an excellent effect in that inflation and expansion of the center airbag portion may be efficiently controlled with a simple structure.

The airbag device for a front passenger seat according to the third aspect has an excellent effect in that, in addition to the effects of according to the first aspect, inflation and expansion of the front passenger seat airbag is not impeded even if a design is employed in which there is a vehicle interior projection at a vehicle width direction central portion of an instrument panel.

BRIEF DESCRIPTION OF THE DRAWINGS

Exemplary embodiments of the present disclosure will be described in detail based on the following figures, wherein:

FIG. 1A is a perspective diagram showing a state in which a front passenger seat airbag device according to a present exemplary embodiment is operated when there is a full overlap frontal collision and only a front passenger seat airbag main body inflates and expands toward the vehicle rear side.

FIG. 1B is a plan view of FIG. 1A.

FIG. 2A is a perspective diagram showing a state in which the front passenger seat airbag device according to the present exemplary embodiment is operated when there is an oblique impact against the driver seat side or the like and both the front passenger seat airbag main body and the center airbag portion inflate and expand toward the vehicle rear side.

FIG. 2B is a plan view of FIG. 2A.

DETAILED DESCRIPTION

Figure 3:
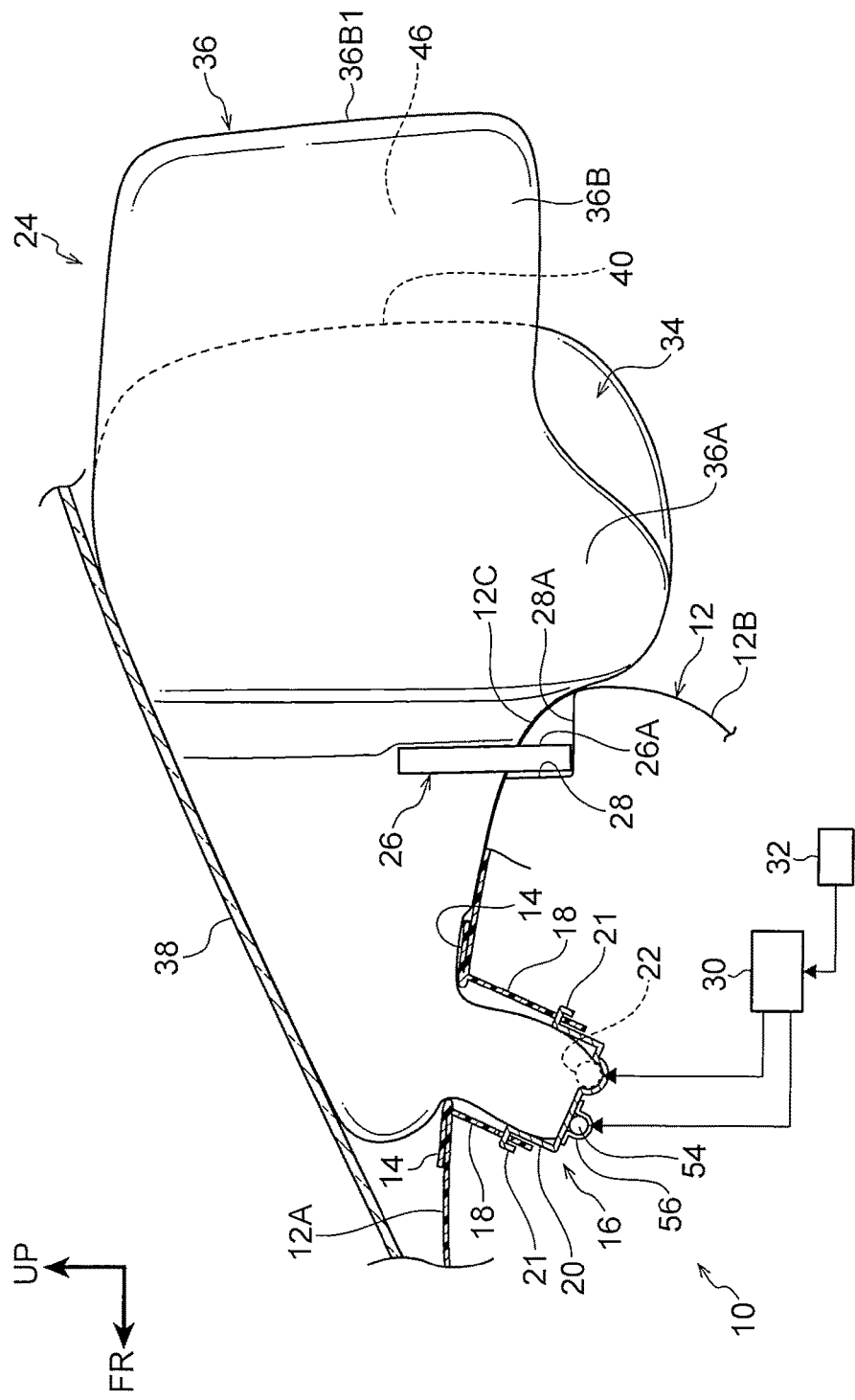
FIG. 3 is a sectional diagram schematically showing a partial cutaway of overall structure of the front passenger seat airbag device according to the present exemplary embodiment in a state in which both the front passenger seat airbag main body and the center airbag portion have inflated and expanded.

A front passenger seat airbag device 10 according to an exemplary embodiment of the present disclosure is described below using FIG. 1 to FIG. 5. An arrow FR that is shown as appropriate in these drawings indicates a vehicle front side, an arrow UP indicates a vehicle upper side, and an arrow IN indicates a vehicle width direction inner side. The front passenger seat airbag device 10 shown in the drawings is for use in a left-hand drive vehicle.

—General Structure of Structures of Front Passenger Seat Airbag Device 10 and Instrument Panel 12—

As shown in FIG. 3, the front passenger seat airbag device 10 is disposed at an upper face portion 12A at the side of an instrument panel 12 at which a front passenger seat is disposed. The front passenger seat airbag device 10 is structured by a pair of front and rear airbag doors 14, which are provided at the side of the front passenger seat airbag device 10 at which the upper face portion 12A is disposed, and an airbag module 16, which is disposed at the vehicle lower side of the airbag doors 14.

A reduced thickness portion (tear line), which is not shown in the drawings, is formed at a rear face side of the upper face portion 12A at the front passenger seat side of the instrument panel 12. The reduced thickness portion is formed in an "H" shape in plan view and ruptures when a predetermined bag inflation force acts thereon. Thus, when a bag inflation force acting on the rear face of the upper face portion 12A is at least the predetermined value, the upper face portion 12A ruptures along the reduced thickness portion (the tear line) and the airbag doors 14 open up both ways in the vehicle front-and-rear direction. Note that the shape of the reduced thickness portion (the tear line) is not limited thus: an airbag door of a single-door type that opens one way in the vehicle front-and-rear direction may be employed; an airbag door that opens three ways—one way in the vehicle front-and-rear direction and to both sides in the vehicle width direction (left and right)—may be employed; and an airbag door of a type that opens four ways—in the vehicle front-and-rear direction and to both sides in the vehicle width direction (left and right) or the like may be employed. Furthermore, the airbag doors 14 are integrated with the instrument panel 12 but this is not limiting. Airbag doors that are structured by separate bodies from the instrument panel may be employed.

A front and rear pair of module mounting portions 18 protrude in parallel diagonally toward the vehicle lower side and the vehicle front side from proximal vicinities of the pair of front and rear airbag doors 14. Plural mounting holes along the vehicle width direction (to which reference symbols are not assigned) are formed at a lower portion of each module mounting portion 18.

The airbag module 16 is provided with a module case 20 fabricated of metal. The module case 20 is formed in a substantial box shape of which the vehicle upper side is open. Plural hooks 21 in hook shapes are formed at a front wall and a rear wall of the module case 20. The hooks 21 engage with the mounting holes of the module mounting portions 18. Thus, the airbag module 16 is mounted at the airbag doors 14 by the hooks 21 being engaged with the mounting holes.

An inflator 22 in a substantially circular rod shape is disposed inside the module case 20. For example, a gas producing agent, which is not shown in the drawings and produces gas when ignited, is charged into the inflator 22. In addition, a filter that removes debris after ignition, a coolant for cooling the gas, and so forth are disposed inside the inflator 22. Thus, when a squib (an ignition device) that is provided at an end portion of the axial direction of the inflator 22 is electrified, the gas generating agent ignites and produces a large quantity of the gas. Although the inflator described above has a substantially circular rod shape, a disc-type inflator with a flattened circular column shape may be employed. Furthermore, although the inflator 22 that is employed is of a type that produces gas using a gas producing agent, this is not limiting; a high-pressure sealed gas-type inflator, a hybrid-type inflator that employs both a gas producing agent and high-pressure gas, or the like may be employed.

A plural number of stud bolts, which are not shown in the drawings, stand from outer periphery portions of this inflator 22. The inflator 22 is inserted through an inflator insertion aperture portion, which is not shown in the drawings, formed in a front passenger seat airbag 24; the stud bolts are passed through the front passenger seat airbag 24 and a floor wall portion 20A (see FIG. 4A) of the module case 20; and the stud bolts are fixed by fastening with nuts. A mounting bracket, which is not shown in the drawings, is fixed to the module case 20. The mounting bracket is fixed to a high-strength, high-stiffness instrument panel reinforcement, which is not shown in the drawings, which is arranged in the vehicle width direction inside the instrument panel 12. Thus, the front passenger seat airbag device 10 is supported at the vehicle body.

As shown in FIG. 3, a vehicle interior projection 26, such as a head-up display, a navigation system or the like, protrudes to the vehicle cabin interior side from a vehicle width direction central portion side of the upper face portion 12A of the instrument panel 12 described above. To be specific, a corner portion 12C connects the upper face portion 12A with a rear face portion 12B of the instrument panel 12, and an accommodation recess portion 28 is integrally formed in the vehicle width direction central portion of the corner portion 12C. The vehicle interior projection 26 such as a head-up display, navigation system or the like is provided standing upright in a rectangular board shape from a floor face 28A of the accommodation recess portion 28.

Now, a system of the front passenger seat airbag device 10 described above is described. The squib (ignition device) of the inflator 22 is electronically connected to an electronic control unit (ECU) 30 that serves as a control section. The ECU 30 is also electronically connected to a collision detection sensor 32.

Regarding a type of the collision detection sensor 32, for example, an acceleration sensor may be employed. If plural acceleration sensors are employed, a collision state and the like may be detected as well as the fact that a collision is occurring. For example, a format may be utilized in which front satellite sensors, which are not shown in the drawings, are provided at front end portion vicinities of a pair of left and right front side members, which are disposed at the two vehicle width direction sides of a vehicle front portion, and a floor sensor, which is not shown in the drawings, is disposed in a floor below a center console.

If accelerations that are substantially equal and that exceed a predetermined threshold value are detected by the left and right satellite sensors, it may be determined that the automobile is in a full overlap frontal collision. If a large acceleration exceeding a predetermined threshold value is detected at only one of the left and right satellite sensors, it may be determined that the automobile is in an offset collision. Predetermined threshold values may be set in advance as references values. Then if an acceleration exceeding a higher threshold value is detected at only one of the left and right satellite sensors, it may be determined that a small overlap collision is occurring at the side of the satellite sensor that detects that acceleration. Further, whether or not a collision is oblique may be determined from respective waveforms of the accelerations detected by the left and right satellite sensors and the floor sensor. In the example described above, a collision determination system employs acceleration sensors but this is not limiting; collision states may be determined by an alternative method.

—Detailed Structure of Front Passenger Seat Airbag 24—

Now, the structure of the front passenger seat airbag 24 is described in detail using FIG. 1 to FIG. 3. The front passenger seat airbag 24 is structured by a front passenger seat airbag main body 34 and a center airbag portion 36. The front passenger seat airbag main body 34 is inflated and expanded toward the side thereof at which the front passenger seat is disposed by gas supplied from the inflator 22. The center airbag portion 36 is formed integrally at the vehicle width direction inner side of the front passenger seat airbag main body 34.

When the front passenger seat airbag main body 34 inflates from the upper face portion 12A of the instrument panel 12 as illustrated in FIG. 3, the front passenger seat airbag main body 34 temporarily abuts against a windshield glass 38, which is disposed diagonally to oppose the upper face portion 12A in the vehicle up-and-down direction. Thereafter, the front passenger seat airbag main body 34 is subjected to reaction forces from the upper face portion 12A and the windshield glass 38 and inflates and expands toward the side at which the front passenger seat is disposed (the vehicle rear side).

The state of the front passenger seat airbag main body 34 that is shown in FIG. 1A and FIG. 1B is a completely expanded state of the front passenger seat airbag main body 34. A first head restraining surface 40 is formed at a rear end portion 34A of the front passenger seat airbag main body 34 in the completely expanded state. The first head restraining surface 40 is for restraining the head H of a passenger seat occupant during a full overlap frontal collision. To describe this more specifically, the first head restraining surface 40 is formed in a shape that is broadly rectangular as viewed from the side at which the passenger seat occupant is disposed. The first head restraining surface 40 is formed in a shape that is symmetrical between left and right about a center line C, which is an up-and-down direction line that links a midpoint of an upper edge with a midpoint of a lower edge of the first head restraining surface 40. A first head restraining surface 40A at the left side, as viewed from the passenger seat occupant side, and a first head restraining surface 40B at the right side are formed in protruding curve shapes in plan view that bulge a little towards the side at which the front passenger seat is disposed. A first valley portion 42 is formed between the left and right first head restraining surfaces 40A and 40B and cuts in toward the vehicle front side. The head H of the passenger seat occupant is caught by the first valley portion 42 and the head H is nipped by the left and right first head restraining surfaces 40A and 40B. Thus, in this structure, turning of the head H about an axis in the vehicle up-and-down direction is suppressed.

By contrast, the state shown in FIG. 2A, FIG. 2B and FIG. 3 is a completely expanded state of both the front passenger seat airbag main body 34 and the center airbag portion 36. As shown in these drawings, the center airbag portion 36 in the completely expanded state thereof is formed in a shape that protrudes to the vehicle width direction inner side from a substantially central portion in the vehicle front-and-rear direction of a side face 34B at the vehicle width direction inner side of the front passenger seat airbag main body 34. As shown in FIG. 3, the center airbag portion 36 is inflated and expanded toward the vehicle rear side while the front passenger seat airbag main body 34 is being subjected to the reaction forces from the upper face portion 12A of the instrument panel 12 and the windshield glass 38 and is inflating and expanding toward the side at which the front passenger seat is disposed. As shown in FIG. 2A, FIG. 2B and FIG. 3, a portion at the front side of the center airbag portion 36 in the vehicle front-and-rear direction is specified with heights in the vehicle up-and-down direction that match the front passenger seat airbag main body 34. Below, this portion is referred to as "the inflation proximal portion 36A". An upper end portion of the inflation proximal portion 36A abuts against the windshield glass 38, and a lower end portion of the inflation proximal portion 36A is pressed against a region of the instrument panel 12 extending from the corner portion 12C to the rear face portion 12B. Thus, in the same manner as the front passenger seat airbag main body 34, the center airbag portion 36 is subjected to reaction forces from the instrument panel 12 and the windshield glass 38 during inflation and expansion, and inflates and expands toward the vehicle rear side.

The center airbag portion 36 is also provided with a protrusion portion 36B that inflates and expands toward the vehicle rear side from the inflation proximal portion 36A. An upper edge of the protrusion portion 36B is specified to have the same height as an upper edge of the inflation proximal portion 36A; a lower edge of the protrusion portion 36B is specified to be at a higher position than a lower edge of the inflation proximal portion 36A. A rear end portion 36B1 of the protrusion portion 36B of the center airbag portion 36 protrudes further to the vehicle rear side than the rear end portion 34A of the front passenger seat airbag main body 34. Thus, as shown in FIG. 2B, a second head restraining surface 46 is formed at a side face 36B2 of the protrusion portion 36B of the center airbag portion 36, facing to the side thereof at which the front passenger seat airbag main body 34 is disposed. The second head restraining surface 46 is a surface that extends in the vehicle front-and-rear direction and the vehicle up-and-down direction. The second head restraining surface 46 is connected with and continues substantially at a right angle from the left side first head restraining surface 40A of the first head restraining surface 40. A second valley portion 48 is formed in the region at which the left side first head restraining surface 40A and the second head restraining surface 46 intersect. The second valley portion 48 cuts in diagonally toward the front side, that is, toward the vehicle front side and the vehicle width direction inner side. The head H of the passenger seat occupant is caught by the second valley portion 48 and the head H is nipped between the left side first head restraining surface 40A and the second head restraining surface 46. Thus, in this structure, turning of the head H about an axis in the vehicle up-and-down direction is suppressed.

As can be understood from the descriptions of the front passenger seat airbag 24 hereabove, the meaning of the phrase "the completely expanded state of the front passenger seat airbag main body" includes states in which the first restraining surface is formed at the rear end portion of the front passenger seat airbag main body, and the meaning of the phrase "the completely expanded state of the center airbag portion" includes states in which the second restraining surface is formed at the side face of the center airbag portion that faces to the side thereof at which the front passenger seat airbag main body is disposed.

—Structure of Strap 50—

Figure 4A:
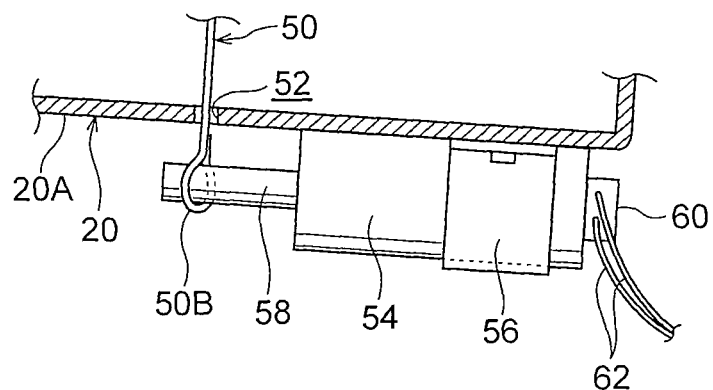
FIG. 4A is a magnified sectional diagram of principal portions, in which a floor wall portion of a module case is cut away, showing a situation in which an actuator is in a first state.

A single strap 50 structured in a belt shape is disposed inside the front passenger seat airbag 24 described above. One length direction end portion 50A of the strap 50 is fixed by stitching to an interior face of a corner portion at the vehicle width direction inner side of the rear end portion 36B1 of the protrusion portion 36B of the center airbag portion 36. Another length direction end portion 50B of the strap 50 is drawn out through the aforementioned inflator insertion aperture portion of the front passenger seat airbag main body 34. Hence, as shown in FIG. 4A, the another length direction end portion 50B is drawn out to the exterior of the module case 20 through a strap insertion hole 52 that is formed in the floor wall portion 20A of the module case 20. The another length direction end portion 50B of the strap 50 is formed in a loop shape.

A length (overall length) of the strap 50 is set to a length that retains (maintains) the folded state of the center airbag portion 36 when the front passenger seat airbag main body 34 completely inflates and expands at the time of a full overlap frontal collision, as shown in FIG. 1A and FIG. 1B. In the descriptions below, the length direction one end portion 50A of the strap 50 is referred to as "the one end portion 50A of the strap 50", and the length direction another end portion 50B of the strap 50 is referred to as "the another end portion 50B of the strap 50".

In the present exemplary embodiment, the strap 50 that is employed is formed in the belt shape of the same material as the front passenger seat airbag main body 34, but this is not limiting. A cord-shaped member may be employed as the strap, or a tether-shaped member with a larger area than the belt cloth may be employed. In some embodiments, a tether-shaped member is employed, in which the member is of a width such that flows of gas are not impeded when the center airbag portion 36 is being inflated and expanded.

—Structure of Actuator 54—

Now, the structure of an actuator 54 that sets the another end portion 50B of the strap 50 to either a retaining state or a released state is described. As shown in FIG. 4A, the actuator 54 is formed in a cylindrical shape and is mounted to an outer side face (a lower face) of the floor wall portion 20A of the module case 20 via a bracket 56. A micro gas generator (below referred to where appropriate as "the MGG"), which is not shown in the drawings, is disposed inside the actuator 54. Operations of the actuator 54 are controlled by the ECU 30.

A rod 58 in a linear rod shape movably protrudes in the axial direction of the actuator 54 from one axial direction end portion of the actuator 54. In an extended state of the rod 58, shown in FIG. 4A, a distal end portion of the rod 58 is inserted through the another end portion 50B of the strap 50. In other words, the another end portion 50B of the strap 50 is engaged with the distal end portion of the rod 58. This state is a "first state" of the actuator 54. In a retracted state of the rod 58, shown in FIG. 4B, the distal end portion of the rod 58 is withdrawn from the another end portion 50B of the strap 50. In other words, the another end portion 50B of the strap 50 is in the released state. This state is a "second state" of the actuator 54.

A connector 60, which is electronically connected to the MGG, is connected to an axial direction other end portion of the actuator 54. Wiring 62 is connected to the connector 60, and the wiring 62 is connected to the aforementioned ECU 30.

Figure 4B:
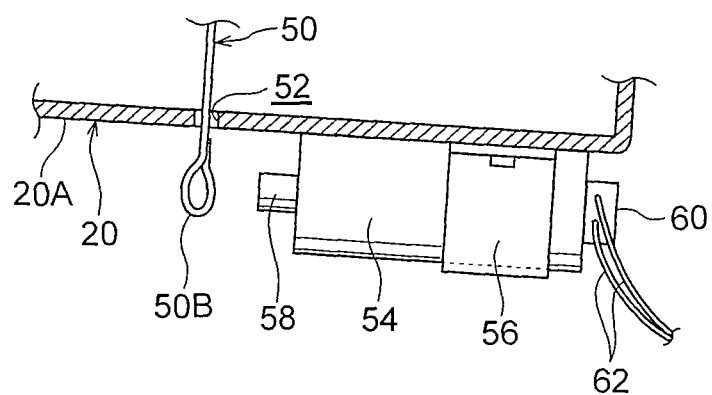
FIG. 4B is a magnified sectional diagram of principal portions showing the same view of a situation in which the actuator is in a second state.
Figure 5:
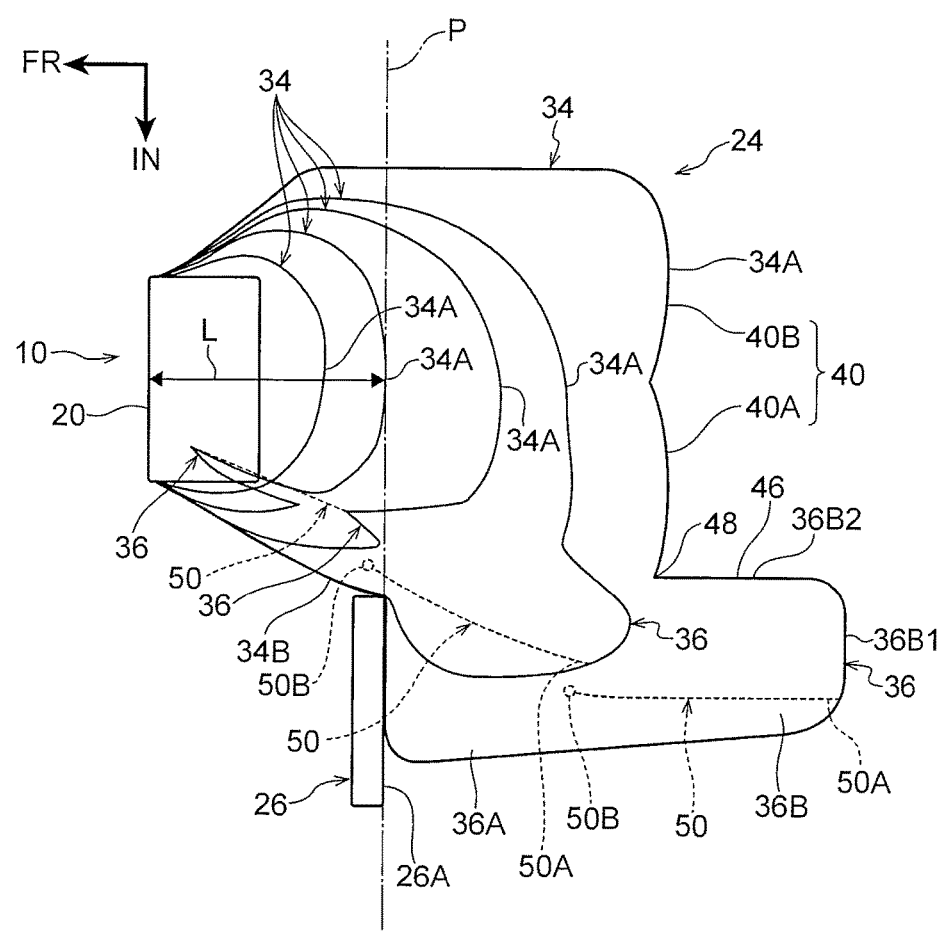
FIG. 5 is a plan view showing a relationship between the center airbag portion and a vehicle interior projection, in which plan views of states in which the front passenger seat airbag shown in FIG. 1A and FIG. 1B progressively inflates and expands to a completely expanded state are drawn as ripple shapes.

As shown in FIG. 5, the ECU 30 is configured so as to switch the actuator 54 from the first state shown in FIG. 4A to the second state shown in FIG. 4B during the inflation and expansion of the front passenger seat airbag main body 34 toward the vehicle rear side when there is an oblique impact against the driver seat side or the like, switching the actuator 54 after the rear end portion 34A of the front passenger seat airbag main body 34 has passed a line P projected in the vehicle width direction from a rear face 26A of the vehicle interior projection 26 but before the expansion of the front passenger seat airbag main body 34 is completed. In the present exemplary embodiment, a distance L from the front end of the module case 20 to the projected line P along the vehicle width direction at the rear face 26A of the vehicle interior projection 26 is 150 mm. The ECU 30 is configured so as to operate the actuator 54 at the moment that the rear end portion 34A of the front passenger seat airbag main body 34 inflating and expanding toward the vehicle rear side has passed a position at the distance L (i.e., the projected line P). That is, the actuator 54 is operated when a predetermined duration has passed after operation (ignition) of the inflator 22, which predetermined duration is required for the rear end portion 34A of the front passenger seat airbag main body 34 to reach a position at the distance L (the projected line P). Because the distance L will differ between different vehicle models, in some embodiments a specification is made for each vehicle model.

To add to the description of collision states, the meaning of the term "oblique impact" (an MDB(Moving Deformable Barrier) impact or an oblique collision) includes a diagonal collision from the front as defined by the National Highway Traffic Safety Administration (NHTSA) (for example, a collision at a relative angle of 15° with the other party of the collision and an overlap amount of around 35% in the vehicle width direction). In this exemplary embodiment, the relative speed of an oblique impact is assumed to be, as an example, 90 km/h. The meaning of the term "small overlap collision" includes a frontal collision of an automobile that is, for example, a collision defined by the Insurance Institute for Highway Safety (IIHS) in which an overlap amount in the vehicle width direction with the other party of the collision is no more than 25%. For example, the term "small overlap collision" corresponds with an offset frontal collision at the vehicle width direction outer side relative to a front side member, which is a vehicle body framework member. In this exemplary embodiment, the relative speed of a small overlap collision is assumed to be, as an example, 64 km/h. The meaning of the term "full overlap collision" includes a collision in which a test vehicle collides face on with an obstacle (a barrier) made of concrete at a speed of 55 km/h.

—Operation and Effects of the Present Exemplary Embodiment—

Now, operation and effects of the present exemplary embodiment are described.

During usual running of the vehicle, the front passenger seat airbag device 10 is in an inactive state. In this state, the front passenger seat airbag main body 34 and the center airbag portion 36 are stowed in the module case 20 in the folded states thereof. Meanwhile, the state in which the another end portion 50B of the strap 50 is engaged with the rod 58 of the actuator 54 is maintained.

In this state, if there is a full overlap frontal collision, the actuator 54 is retained in the first state shown in FIG. 4A (an inactive state) by the ECU 30. Thus, the state in which the another end portion 50B of the strap 50 is engaged with the rod 58 continues to be maintained and the another end portion 50B is not released from the rod 58.

A predetermined electric current is passed through the squib (ignition device) of the inflator 22 by the ECU 30. As a result, the inflator 22 operates and a large quantity of gas is produced. The produced gas is supplied to the interior of the front passenger seat airbag main body 34 and inflates the front passenger seat airbag main body 34. During this process, the airbag doors 14 open up to both sides in the vehicle front-and-rear direction and the front passenger seat airbag main body 34 inflates to the upper side of the upper face portion 12A of the instrument panel 12. After the inflating front passenger seat airbag main body 34 abuts against the windshield glass 38, the front passenger seat airbag main body 34 is subjected to reaction forces from the upper face portion 12A of the instrument panel 12 and the windshield glass 38 and the front passenger seat airbag main body 34 inflates and expands toward the side at which the front passenger seat is disposed (the vehicle rear side). Hence, the first head restraining surface 40 is formed at the rear end portion 34A of the front passenger seat airbag main body 34 in the completely expanded state. As illustrated in FIG. 1B, the head H of the passenger seat occupant that is moving by inertia toward the vehicle front side is caught at the first head restraining surface 40 and the head H is restrained by the first head restraining surface 40. Accordingly, the head H of the passenger seat occupant is nipped between the left side first head restraining surface 40A and the right side first head restraining surface 40B. Thus, turning of the head H about an axis in the vehicle up-and-down direction is suppressed.

As shown in FIG. 1A, in the process described above, because the another end portion 50B of the strap 50 is retained in the state of engagement with the distal end portion of the rod 58, the folded state of the center airbag portion 36 is maintained. That is, the gas supplied from the inflator 22 inflates and expands only the front passenger seat airbag main body 34 rather than inflating and expanding both the front passenger seat airbag main body 34 and the center airbag portion 36. Therefore, the front passenger seat airbag main body 34 is inflated and expanded rapidly. Thus, the head H of the passenger seat occupant may be promptly restrained by the front passenger seat airbag main body 34 when there is a full overlap frontal collision.

Alternatively, when there is an oblique impact against the driver seat side or the like, the actuator 54 is put into the second state by the ECU 30. That is, the actuator 54 is operated, as a result of which the rod 58 moves in the axial direction and the distal end portion of the rod 58 is withdrawn from the another end portion 50B of the strap 50. Thus, the another end portion 50B of the strap 50 is released from the rod 58, resulting in a state in which the center airbag portion 36 can be inflated and expanded. Therefore, the gas produced from the inflator 22 is supplied to both the front passenger seat airbag main body 34 and the center airbag portion 36. Hence, the front passenger seat airbag main body 34 inflates and expands toward the vehicle rear side, and the first head restraining surface 40 is formed at the rear end portion 34A of the front passenger seat airbag main body 34 in the completely expanded state thereof.

Meanwhile, the center airbag portion 36 at the vehicle width direction inner side of the front passenger seat airbag main body 34 inflates and expands toward the vehicle rear side. The rear end portion 36B1 of the center airbag portion 36 in the completely expanded state protrudes further to the vehicle rear side than the rear end portion 34A of the front passenger seat airbag main body 34. Thus, the second head restraining surface 46 is formed at the side face 36B2 facing to the side thereof at which the front passenger seat airbag main body 34 is disposed. Hence, as shown in FIG. 2B, the head H of the passenger seat occupant that is moving by inertia diagonally toward the vehicle front—toward the vehicle front side and the vehicle width direction inner side, which is the side toward the impact—is caught by both the left side first head restraining surface 40A of the first head restraining surface 40 and the second head restraining surface 46, and the head H is restrained.

That is, when there is an oblique impact against the driver seat side or the like, the center airbag portion 36 that is formed integrally with the front passenger seat airbag main body 34 inflates and expands, and turning of the head H of the passenger seat occupant about an axis in the vehicle up-and-down direction is suppressed by both the left side first head restraining surface 40A and the second head restraining surface 46. Therefore, head protection performance for the passenger seat occupant when there is an oblique impact against the driver seat side or the like is improved compared to a front passenger seat airbag that is not equipped with a center airbag portion or the airbag system recited in JP-A No. 2015-113027 that is described in the Background section above, in which a front passenger seat airbag and a center airbag are separately and independently structured.

Thus, according to the front passenger seat airbag device 10 according to the present exemplary embodiment, both head protection performance for a passenger seat occupant when there is an oblique impact against the driver seat side or the like may be improved and head restraint performance for the passenger seat occupant when there is a full overlap frontal collision may be assured.

If there is an oblique impact against the front passenger seat side of the vehicle front portion or the like, in contrast to when there is an oblique impact against the driver seat side of the vehicle front portion or the like, the head H of the passenger seat occupant moves diagonally by inertia toward the vehicle front side and the vehicle width direction outer side. In this situation, if the vehicle is equipped with a curtain airbag device along a front pillar and a roof side rail, an end portion at the vehicle width direction outer side of a roof headlining is resiliently deformed and a curtain airbag inflates and expands toward the vehicle lower side. Hence, the head H of the passenger seat occupant is restrained by the curtain airbag and the front passenger seat airbag main body 34.

In the present exemplary embodiment, the one end portion 50A of the strap 50 is fixed to the interior face of the corner portion at the vehicle width direction inner side at the rear end portion 36B1 of the protrusion portion 36B of the center airbag portion 36. Therefore the corner portion, which is a location that is furthest from the inflator 22 in the completely expanded state, is pulled in by the strap 50. Accordingly, the length of the strap 50 may be made short, and the front passenger seat airbag main body 34 and center airbag portion 36 are not overlarge during folding. Thus, according to the present exemplary embodiment, inflation and expansion of the center airbag portion 36 may be efficiently controlled with a simple structure.

In the present exemplary embodiment, the vehicle interior projection 26 that protrudes to the vehicle cabin interior side is provided at the vehicle width direction central portion of the upper face portion 12A of the instrument panel 12. Consequently, if a center airbag portion for which no consideration was given to interference with the vehicle interior projection was simply inflated and expanded when there was an impact against the driver seat side or the like, this center airbag portion might interfere with the vehicle interior projection during the inflation and expansion.

However, with the center airbag portion 36 according to the present exemplary embodiment, when the completely expanded state of the center airbag portion 36 is viewed in a vehicle plan view as shown in FIG. 5, the rear end portion 36B1 of the protrusion portion 36B of the center airbag portion 36 is disposed at the vehicle rear side relative to the vehicle interior projection 26. Therefore, considering the completely expanded shape of the center airbag portion 36, the center airbag portion 36 does not interfere with the vehicle interior projection 26. Further, when there is an oblique impact against the driver seat side or the like, the ECU 30 switches the actuator 54 from the first state to the second state during the inflation and expansion of the front passenger seat airbag main body 34 toward the vehicle rear side, after the rear end portion 34A of the front passenger seat airbag main body 34 has passed the line P projected in the vehicle width direction from the rear face 26A of the vehicle interior projection 26 but before the front passenger seat airbag main body 34 has completely expanded. As an example in the present exemplary embodiment, the distance L from the front end of the module case 20 to the projected line P along the vehicle width direction through the rear face 26A of the vehicle interior projection 26 is 150 mm, and the actuator 54 is operated at a moment when the rear end portion 34A of the front passenger seat airbag main body 34 that is inflating and expanding toward the vehicle rear side has passed a position at the distance L (the projected line P). Therefore, the center airbag portion 36 inflates and expands after the rear end portion 34A of the front passenger seat airbag main body 34 has passed the line projected along the vehicle width direction through the rear face 26A of the vehicle interior projection 26. Thus, interference between the center airbag portion 36 and the vehicle interior projection 26 is avoided. Thus, in the present exemplary embodiment, inflation and expansion of the front passenger seat airbag 24 is not impeded even if a design is employed in which the vehicle interior projection 26 is present at a vehicle width direction central portion of the instrument panel 12.

—Supplementary Descriptions of the Exemplary Embodiments—

In the present exemplary embodiment described above, the structure is employed in which the another end portion 50B of the strap 50 is formed in a ring shape and is engaged with the rod 58, but this is not limiting. A structure may be employed in which the another end portion of a strap is fixed at a side thereof at which an actuator is provided and the another end portion is released by a vicinity of the another end portion being cut.

In the exemplary embodiment described above, the one end portion 50A of the strap 50 is fixed to the interior face of the corner portion at the vehicle width direction inner side at the rear end portion 36B1 of the protrusion portion 36B of the center airbag portion 36, but this is not limiting. It is sufficient if the one end portion 50A is fixed to an interior face at the side of the protrusion portion 36B of the center airbag portion 36 at which the rear end portion 36B1 is provided.

In the exemplary embodiment described above, when there is an oblique collision against the driver seat side or the like, the ECU 30 operates the actuator 54, for example, at the moment at which the rear end portion 34A of the front passenger seat airbag main body 34 that is inflating and expanding toward the vehicle rear side has reached a position at the aforementioned distance L, but this is not a fundamental limitation. It is sufficient if the another end portion of the strap is released after the rear end portion of the front passenger seat airbag main body inflating and expanding toward the vehicle rear side has passed the line projected in the vehicle width direction from the rear face of the vehicle interior projection but before the front passenger seat airbag main body has completely expanded. Furthermore, if an instrument panel at which no vehicle interior projection is provided is employed, the actuator may be operated before the rear end portion of the front passenger seat airbag main body inflating and expanding toward the vehicle rear side reaches a position at the aforementioned distance.

In the exemplary embodiment described above, the present disclosure is applied to the front passenger seat airbag device 10 of the type in which the front passenger seat airbag 24 inflates from the upper face portion 12A side of the instrument panel 12, but this is not limiting. The present disclosure may also be applied to a front passenger seat airbag device of a type in which a front passenger seat airbag inflates from a rear face portion side of an instrument panel. In this case, the center airbag portion inflates and expands while being subjected to a reaction force from the instrument panel.

What is claimed is:

1. An airbag device for a front passenger seat, comprising:
    a front passenger seat airbag main body that is provided at a side of an instrument panel at which a front passenger seat is disposed, the front passenger seat airbag main body being inflated and expanded toward the side thereof at which the front passenger seat is disposed by gas that is supplied from an inflator, and a first head restraining surface being formed at a rear end portion of the front passenger seat airbag main body in a completely expanded state thereof;
    a center airbag portion that is formed integrally at a vehicle width direction inner side of the front passenger seat airbag main body, the center airbag portion being inflated and expanded toward a vehicle rear side by the gas that is supplied from the inflator, and a second head restraining surface being formed at a side face of the center airbag portion by a rear end portion of the center airbag portion in a completely expanded state thereof protruding further to the vehicle rear side than the rear end portion of the front passenger seat airbag main body, the side face facing to the side of the center airbag portion at which the front passenger seat airbag main body is disposed;
    an actuator that is configured to switch a strap between a first state and a second state, one end portion of the strap being fixed to an interior face at the side of the center airbag portion at which the rear end portion is provided, the center airbag portion being retained in a folded state in the first state, and another end portion of the strap being released and the center airbag portion being allowed to inflate and expand in the second state; and
    a control section that sets the actuator to the first state when there is a full overlap frontal collision, and that sets the actuator to the second state when there is an impact that is any of an oblique collision against a driver seat side of a vehicle front portion or a small overlap collision,
    wherein a vehicle interior projection that protrudes to a vehicle cabin interior side is provided at a vehicle width direction central portion of an upper face portion of the instrument panel,
    wherein in a vehicle plan view, the completely expanded state of the center airbag portion projects to the vehicle width direction inner side from a substantially central portion in a vehicle front-and-rear direction of a side face at the vehicle width direction inner side of the front passenger seat airbag main body, and
    wherein when there is an impact that is any of an oblique collision against the driver seat side of the vehicle front portion or a small overlap collision, the control section switches the actuator from the first state to the second state while the front passenger seat airbag main body is inflating and expanding toward the vehicle rear side after the rear end portion of the front passenger seat airbag main body has passed a line projected along the vehicle width direction through a rear face of the vehicle interior projection but before the front passenger seat airbag main body has completely expanded.

2. The airbag device for a front passenger seat according to claim 1, wherein the center airbag portion is folded along a side face at the vehicle width direction inner side of the front passenger seat airbag main body and is retained in the folded state by the strap.

3. The airbag device for a front passenger seat according to claim 1, wherein the control section is an electronic control unit.

4. An airbag device for a front passenger seat, comprising:
    a front passenger seat airbag main body that is provided at a side of an instrument panel at which a front passenger seat is disposed, the front passenger seat airbag main body being inflated and expanded toward the side thereof at which the front passenger seat is disposed by gas that is supplied from an inflator, and a first head restraining surface being formed at a rear end portion of the front passenger seat airbag main body in a completely expanded state thereof;
    a center airbag portion that is formed integrally at a vehicle width direction inner side of the front passenger seat airbag main body, the center airbag portion being inflated and expanded toward a vehicle rear side by the gas that is supplied from the inflator, and a second head restraining surface being formed at a side face of the center airbag portion by a rear end portion of the center airbag portion in a completely expanded state thereof protruding further to the vehicle rear side than the rear end portion of the front passenger seat airbag main body, the side face facing to the side of the center airbag portion at which the front passenger seat airbag main body is disposed;
    an actuator that is configured to switch a strap between a first state and a second state, one end portion of the strap being fixed to an interior face at the side of the center airbag portion at which the rear end portion is provided, the center airbag portion being retained in a folded state in the first state, and another end portion of the strap being released and the center airbag portion being allowed to inflate and expand in the second state; and a control section that sets the actuator to the first state when there is a full overlap frontal collision, and that sets the actuator to the second state when there is an impact that is any of an oblique collision against a driver seat side of a vehicle front portion or a small overlap collision, wherein the one end portion of the strap is fixed to an interior face of a corner portion at the vehicle width direction inner side at the rear end portion of the center airbag portion, wherein a vehicle interior projection that protrudes to a vehicle cabin interior side is provided at a vehicle width direction central portion of an upper face portion of the instrument panel, wherein in a vehicle plan view, the completely expanded state of the center airbag portion projects to the vehicle width direction inner side from a substantially central portion in a vehicle front-and-rear direction of a side face at the vehicle width direction inner side of the front passenger seat airbag main body, and wherein when there is an impact that is any of an oblique collision against the driver seat side of the vehicle front portion or a small overlap collision, the control section switches the actuator from the first state to the second state while the front passenger seat airbag main body is inflating and expanding toward the vehicle rear side after the rear end portion of the front passenger seat airbag main body has passed a line projected along the vehicle width direction through a rear face of the vehicle interior projection but before the front passenger seat airbag main body has completely expanded.

5. The airbag device for a front passenger seat according to claim 4, wherein the center airbag portion is folded along a side face at the vehicle width direction inner side of the front passenger seat airbag main body and is retained in the folded state by the strap.

6. The airbag device for a front passenger seat according to claim 4, wherein the control section is an electronic control unit.

* * * * *